May 7, 1946.  O. T. FRANCIS  2,399,668

IMPULSE DURATION RESPONSIVE OR INDICATING DEVICE

Filed Aug. 24, 1943

Inventor
Oliver T. Francis

Patented May 7, 1946

2,399,668

UNITED STATES PATENT OFFICE 2,399,668

IMPULSE DURATION RESPONSIVE OR INDICATING DEVICE

Oliver T. Francis, Renville, Minn.

Application August 24, 1943, Serial No. 499,757

14 Claims. (Cl. 177—353)

This invention relates to impulse duration responsive or indicating devices, and more particularly to means selective to signals of predetermined time durations.

Various circuits have been proposed which are selective to signals of predetermined time durations. Some of these circuits have found utility in the art of automatic telegraph transmission to differentiate between the "dots" and "dashes" of the International Morse code. Such circuits are not highly selective in their response to signals of predetermined time length, but are only capable of differentiating between signals of widely different time lengths such as a "dot" or a "dash," a "dash" being three times the length of a "dot." It is an object of this invention to provide a vacuum tube circuit which shall be highly selective in its response to signals of predetermined duration only. Another object is to provide a circuit in which any one of a large number of electro-responsive devices may be operated by a corresponding one of a large number of time length signals.

Another object is to provide a circuit responsive to electrical currents of predetermined time length regardless of the magnitude of said currents thereby preventing the effects of shock excitation from high voltages such as static in conventional amplifier circuits.

Another object is to provide a duration indicating means wherein the signal voltage initiates a predetermined rate of change in voltage between the plates of a condenser for the duration of said signal and means for indicating the voltage of the remaining charge on said condenser at the end of said signal for indicating the duration of said signal.

Another object is to provide a time measuring device wherein the charge on a condenser is changed at a predetermined rate for the duration of said time and means of indicating the voltage of the charge remaining on said condenser at the end of said time duration as an indication of the length of said time duration.

In time indicating devices wherein the indicating means depends on the charge remaining on a condenser at the expiration of a time length to be determined, it has in the past been difficult to indicate the exact value of said charge without a plurality of stages of vacuum tube amplification. It is an object of this invention to provide a single circuit wherein a plurality of condensers may be successively discharged whereby the "scanner voltage" may be effectively multiplied by the number of said condensers, and greater exactitude in measuring said time length may be made possible.

Another object is to provide a novel means for initiating a pulse when the direction of charge of a condenser changes to initiate a voltage indicating means for indicating the value of the charge on said condenser when said direction changes.

Another object is to provide a vacuum tube having an input and an output circuit, a resistance shunted by a condenser in said input and output circuit, the primary of a transformer connected in said output circuit, means for impressing a negative potential on said input circuit for a period of time to be determined, means for indicating the voltage across said condenser, and means for applying a pulse from the secondary of said transformer to said indicating means to render it operative at the instant said condenser changes from a discharging to a charging condition.

In Fig. 2 of U. S. Patent No. 2,300,664, I illustrated a receiver which would respond to two input pulses separated by a predetermined duration of time, and a photoelectric means for varying said duration in accordance with a secret record. It is an object of my present invention to illustrate a similar receiver which will respond to an input signal of predetermined duration and a photoelectric record for varying said duration.

Another object is to provide means for changing the signal time length of which an electro-responsive device is responsive in accordance with a record. Another object is to provide photoelectric means for varying the signal duration to which an electro-responsive device is responsive.

These and other objects of the invention will become obvious from the following description, claims, and figures, wherein:

Figure 1:
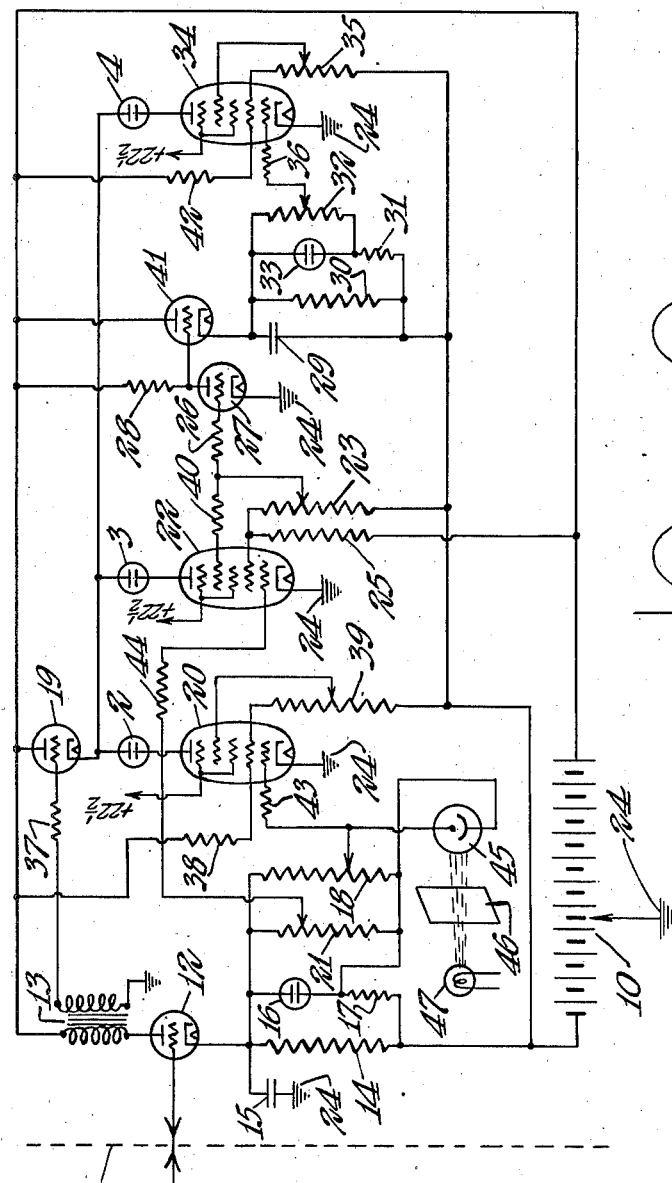
Fig. 1 illustrates a circuit diagram for an impulse duration responsive or indicating device comprising my invention.
Figure 2:
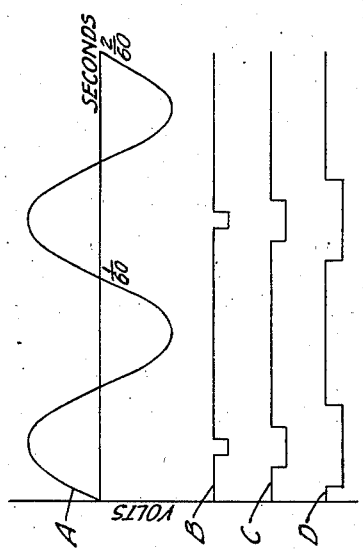
Fig. 2 shows voltages of several time lengths applied to the device.

Referring to Fig. 1, the apparatus to the left of dotted line I comprises means for producing pulses of any desired time length as shown in Fig. 2 (B, C, or D.)

The apparatus to the right of dotted line I illustrates means responsive to pulses of duration shown in Fig. 2 (B, C, or D) and rendering corresponding electro-responsive devices 2, 3, or 4 responsive.

The means for producing pulses of varying time length such as shown in Fig. 2 (B, C, or D) comprises an alternating current generator 5 in the primary of transformer 6. One terminal of the secondary of this transformer is connected to a high amplification factor vacuum tube 8 through a high resistance 7. The other terminal of secondary of transformer 6 is connected to a point on potentiometer 9. One terminal of potentiometer 9 is connected to the negative terminal of battery 50. The other terminal is connected to the cathode of vacuum tube 8 and to a point on battery 50, more positive than its negative terminal.

The anode of vacuum tube 8 is connected through resistance 11 to the positive terminal of battery 50.

The signals produced by vacuum tube 8 are of varying time length as shown in Fig. 2 (B, C, or D) and are impressed on the receiving apparatus to the right of dotted line 1, the grid of vacuum tube 12 being connected to the anode of tube 8. The anode of vacuum tube 12 is connected through primary of transformer 13 to the positive terminal of battery 10. The cathode of vacuum tube 12 is connected through resistance 14 in parallel with condenser 15 to the negative terminal of battery 10. In parallel with resistance 14 is a gas discharge device 16 and resistance 17. Voltage dividers 21 and 18 are in parallel with device 16.

The output circuit of vacuum tube 12 may be traced from ground 24, to positive terminal of battery 10, primary of transformer 13, anode to cathode of tube 12, resistance 14, negative terminal of battery 10 to ground 24. Condenser 15 connects the cathode of tube 12 to ground. The input circuit of tube 12 may be traced from grid of tube 12, to resistance 11, positive terminal of battery 50, ground 24, negative terminal of battery 10, resistance 14, to cathode of tube 12. It is therefore apparent that resistance 14 together with a portion of battery 10 in parallel with condenser 15 are connected in the common input and output circuit of tube 12. Due to the well known fact that the anode to cathode voltage drop of a gas discharge device such as 16, is substantially independent of current flow, variations in voltage across resistance 14 produced by varying the potential of the grid of tube 12, appear across resistance 17, while the voltage drop across gas discharge device 16 remains substantially constant.

Vacuum tube 20 may be of the pentigrid converter type. Its first grid is connected to potentiometer 18 near the negative terminal of that potentiometer through high resistance 43. Its anode grid is connected through resistance 38 to the positive terminal of battery 10, and to the negative terminal of battery 10 through potentiometer 39. The third and fifth grids are connected together internally and to a positive terminal of battery 10. The fourth grid is connected to a midpoint of potentiometer 39. Its cathode is connected to ground 24. Its anode is connected through an electro-responsive device in the form of gas discharge device 2 to the cathode of vacuum tube 19. The anode of tube 19 is connected to the positive terminal of battery 10. One terminal of secondary of transformer 13 is connected to grid of tube 19 through resistance 37. The other terminal of said secondary is connected to ground 24.

Vacuum tube 22 may also be of the pentigrid converter type. Its first grid is connected to potentiometer 21 through resistance 44, at a point more positive than the point where the first grid of tube 20 is connected to potentiometer 18. Its anode grid is connected through resistance 25 to the positive terminal of battery 10 and through potentiometer 23 to negative terminal of battery 10. Its third and fifth grids are connected together internally and to a positive terminal of battery 10. Its fourth grid is connected to a midpoint on potentiometer 23 through resistance 40. Its cathode is connected to ground 24. Its anode is connected through electro-responsive device 3, in the form of a gas discharge device, to the cathode of vacuum tube 19.

Vacuum tube 27 may be a high mu triode. Its grid is connected through resistance 26 to midpoint of potentiometer 23. Its cathode is connected to ground. Its anode is connected through resistance 28 to the positive terminal of battery 10.

Vacuum tube 41 may be a triode. Its anode is connected to the positive terminal of battery 10. Its grid is connected to the anode of tube 27. Its cathode is connected through resistance 30 in parallel with condenser 29 to negative terminal of battery 10. In parallel with resistance 30 is gas discharge device 33 in series with resistance 31. Potentiometer 32 is in parallel with gas discharge device 33.

Vacuum tube 34 may also be of the pentigrid converter type. Its cathode is connected to ground 24. Its first grid is connected through resistance 36 to a point on potentiometer 32. Its anode grid is connected to positive terminal of battery 10, through resistance 42, and to negative terminal of battery 10 through potentiometer 35. Its third and fifth grids are connected together and to a positive terminal of battery 10. Its fourth grid is connected to a point on potentiometer 35. Its anode is connected through electro-responsive device 4 in the form of a gas discharge device, to the cathode of vacuum tube 19.

The output circuit of vacuum tube 19 may be traced from the positive terminal of battery 10, to the anode and cathode of tube 19 and through three parallel paths to ground 24. A first of these paths includes gas discharge device 2, the anode and cathode of tube 20 and ground 24. A second path includes gas discharge device 3, the anode and cathode of tube 22, and ground 24. A third of these paths includes gas discharge device 4, the anode and cathode of tube 34 and ground 24. The input circuit of vacuum tube 19 can be traced from its grid through resistance 37, secondary of transformer 13, to ground 24, and to cathode of tube 19, through the above three parallel paths just described. It will be noted that said three parallel paths are in the common input output circuit of vacuum tube 19.

The output circuit of vacuum tube 41 may be traced from the positive terminal of battery 10, anode to cathode of tube 41, resistance 30, negative terminal of battery 10. Condenser 29 is in parallel with resistance 30. The input circuit of tube 41 can be traced from the grid of tube 41, the anode to cathode of vacuum tube 27, ground 24, negative terminal of battery 10, resistance 30 to cathode of tube 41. It will be noted that resistance 30 in parallel with condenser 29 is in the common input output circuit of tube 41.

The output circuit of tube 27 can be traced from the positive terminal of battery 10, to resistance 28, anode to cathode of tube 27, ground 24, to positive terminal of battery 10. The input circuit of tube 27 can be traced from the grid of tube 27, to resistance 26, midpoint on potentiometer 23, negative terminal of battery 10, to ground and cathode of tube 27.

The first grid circuit of vacuum tube 20 can be traced from said first grid, through resistance 43, midpoint on voltage divider 18, resistance 17, negative terminal of battery 10, to ground 24, and cathode of tube 20. The anode grid circuit of tube 20 can be traced from the positive terminal of battery 10, resistance 38, anode grid of tube 20, cathode of tube 20, ground 24, to positive terminal of battery 10. Potentiometer 39 is connected from said anode grid to the negative terminal of battery 10. The fourth grid circuit of tube 20 can be traced from the midpoint of potentiometer 39, negative terminal of battery 10, ground 24, to cathode of tube 20. Anode space current can pass through tube 20 only when none of its grids are sufficiently negative to block said anode current. As the first grid of tube 20 tends to assume a less negative potential this anode space current increases, but the anode grid space current through resistance 38 also increases with the resulting lowering of potential of said anode grid. A portion of this lowered potential is applied to the fourth grid of tube 20 by potentiometer 39, and when said fourth grid is sufficiently negative anode space current through tube 20 is blocked by the negative potential on its fourth grid. It follows that tube 20 is conductive to anode current for one value of input voltage applied to its first grid. The value of this input voltage is slightly more negative than ground, that is the voltage that the cathode of tube 12 is above ground 24, minus the D. C. voltage drop across the portion of potentiometer 18 between the cathode of tube 12 and the point where resistance 43 is connected to potentiometer 18.

Similarly vacuum tube 22 is conductive to only one value of voltage applied to its first grid through resistance 44, by potentiometer 21, which is connected between the cathode of tube 12 and the negative terminal of gas discharge device 16. By varying the point on potentiometer 21 where resistance 44 connects tube 22 is conductive to anode space current for a different value of potential of cathode of tube 12 than tube 20 is conductive. The function of potentiometers 18 and 21 is therefore to render tubes 20 and 22 conductive to anode space current for different potentials of the cathode of tube 12. Similarly the function of potentiometer 32 is to render tube 34 conductive to anode space current when the cathode of tube 41 assumes desired potential.

A photo-electric cell 45, controlled by light 47 through screen 46 is connected between the variable contact of potentiometer 18 and negative terminal of gas discharge device 16. The potential of cathode of tube 12 for which anode space current will flow in tube 20 can also be controlled by variably illuminating photoelectric cell 45. Since the anode of cell 45 is connected to the variable contact of potentiometer 18 and the cathode of cell 45 is connected to the negative terminal of potentiometer 18, when cell 45 is strongly illuminated increased current flows through the upper portion of this potentiometer, the anode to cathode of cell 45 to the negative terminal of potentiometer 18. This results in an increased voltage drop between the cathode of tube 12 and the grid of tube 20, with the result that anode space current will flow through tube 20 when the cathode of tube 12 is at a higher potential than if cell 45 were not illuminated.

Since the amount of light from light 47 incident on photoelectric cell 45 is dependent on the transparency of record 46 it follows that the duration of negative pulse impressed on the grid of tube 12 for which anode space current may flow through tube 20 is controlled by the transparency of record 46. Since this record can be kept secret communication with my device can be kept secret. The general method of introducing secrecy into communication by photoelectric records is described in detail in my U. S. Patent No. 2,300,664 to which reference is made. In Fig. 2 of that patent I illustrated a receiver responsive to pulses separated by a predetermined duration and varied said duration with a secret photoelectric record. In my present invention I have illustrated a load in the form of a gas discharge device 2, illuminated by pulses of one duration of negative voltage applied to the grid of tube 12, and means for varying said duration by a secret record 46.

In operation, alternating current generator 5 may produce a sine wave current of any convenient frequency such as 60 cycles per second. The voltage of this current is changed to any desired voltage by secondary of transformer 6. This desired voltage may be diagrammatically shown in Fig. 2 (A). Since vacuum tube 8 is a high mu tube current flows through resistance 11 only when the grid of tube 8 is positive (or slightly negative). Resistance 7 being several megohms the grid of tube 8 never assumes a high positive potential. Potentiometer 9 biases grid of tube 8 negative past its cutoff except for the brief period of time in the cycle that transformer 6 throws grid of tube 8 sufficiently positive for tube 8 to conduct current. This time can be varied by varying the point where secondary of transformer 6 connects to potentiometer 9. In Fig. 2 (B) the connection to potentiometer 9 is so near the negative of battery 50 as to permit secondary of transformer 6 to impress a positive potential on grid of tube 8 for only a small part of the cycle and the voltage of anode 8 is reduced for only this small part of the cycle.

In Fig. 2 (C) potentiometer 9 impresses less negative voltage on grid of tube 8. Consequently the voltage of its anode is reduced for a longer period of time in the cycle.

In Fig. 2 (D) potentiometer 9 impresses much less negative voltage on grid of tube 8 with result that its anode voltage is reduced for a period of nearly one-half the cycle of the voltage shown in Fig. 2 (A).

When negative pulses of time length shown in Fig. 2 (B) are impressed on the grid of vacuum tube 12, condenser 15 discharges only slightly through resistance 14. This discharge is sufficient to permit the first grid of vacuum tube 20 to assume a slightly negative potential (light 47 being extinguished and photoelectric cell 45 having a substantially infinite resistance). As the grid of tube 12 tends again to go positive secondary of transformer 13 impresses a positive pulse on the grid of tube 19 with the result that current flows from positive terminal of battery 10, anode to cathode of tube 19, electro-responsive device 2, anode to cathode of tube 20 to ground 24. Current cannot, however, flow through electro-responsive devices 3 or 4, since the first grid of tube 22 is positive causing a high voltage drop across resistance 25 with resultant blocking of anode space current through tube 22 by its fourth grid by potentiometer 23. The grid of tube 27 also being negative the voltage of the grid of tube 41 is highly positive with the result that the first grid of tube 34 is positive and the fourth grid of tube 34 blocks space current through electro-responsive device 4.

If negative pulses of a longer duration such as shown in Fig. 2 (C) are applied to the grid of tube 12, condenser 15 discharges to such an extent as to permit the first grid of tube 22 to assume a slightly negative potential and when grid of tube 12 again tends to assume a positive potential and secondary of transformer 13 impresses a positive pulse on grid of tube 19, current flows from positive terminal of battery 10, anode to cathode of tube 19, electro-responsive device 3, anode to cathode of tube 22 to ground 24. Current cannot flow through electro-responsive device 4, since while the grid of tube 27 is thrown positive and the grid of tube 41 negative the RC time element of condenser 29 resistance 30, is sufficiently large that sufficient of the charge on condenser 29 does not leak off to permit first grid of tube 34 to assume a slightly negative potential. Electro-responsive device 2 is also inoperable at this instant since the first grid of tube 20 is sufficiently negative to block current through device 2.

If pulses of longer negative duration such as shown in Fig. 2 (D) are applied to grid of tube 12, sufficient of the charge on condenser 15 leaks off to permit the first grids of tubes 20, 22 to block current through devices 2, 3, but grid of tube 27 is thrown positive and grid of tube 41 negative for a period of time sufficient for charge on condenser 29 to leak off sufficiently to permit first grid of tube 34 to assume a slightly negative potential. When the secondary of transformer 13 impresses a positive pulse on grid of tube 19 at completion of signal shown in Fig. 2 (D) current flows from positive terminal of battery 10, anode to cathode of tube 19, electro-responsive device 4, anode to cathode of tube 34 to ground 24.

To further illustrate the functioning of my circuit the constants of a circuit used in tests are given. It is to be understood that my invention is not limited to the values of these constants or even to the particular circuit arrangement of parts illustrated, the invention being defined in the appended claims.

Generator 5 was the 110 A. C. sixty cycle power lines. The voltage across the secondary of transformer 6 was 35 volts. Potentiometer 9 was of one megohm value, and was connected between the negative terminal of battery 50 and a point thereon 45 volts more positive. Positives of batteries 10 and 50 were plus 135 volts. Their negative terminals were minus 90 volts each. Vacuum tubes 8 and 27 were type 2A6. Tube 12 was type 2A5, connected as a triode. Tubes 20, 22, 34 were type 2A7. Tubes 41, 19 were type 27. Resistances 11, 17 were a half megohm each. Condenser 15 was a tenth microfarad. Potentiometers 23, 35, 39 were 20 megohms each and a connection was made to the center tap of each. Potentiometers 18, 21, and 32 were 10 megohms each. Resistances 7, 26, 40 were 20 megohms each. Resistances 36, 44, 43 were 10 megohms each. Gas discharge devices 16, 33 maintained a constant voltage drop of 135 volts across each. Electro-responsive devices in the form of gas discharge devices 2, 3, 4 became conductive at 70 volts each. Transformer 13 was a 5 to 1 step-up audio transformer.

In this experimental circuit when the length of signal was lengthened by varying potentiometer 9 it was possible to selectively "tune in" eight different signal pulse lengths with a tube such as 20 whose grid was connected to potentiometer 18 (light 47 being extinguished). Then as the signal was further lengthened it was possible to "tune in" five additional signals by a tube 34 whose grid was connected to potentiometer 32. Since the maximum negative signal pulse as shown in Fig. 2 ((D) was less than .01 second it is obvious that I was able to discriminate between signal pulse lengths differing in length by only a few ten thousandths of a second.

When the movable contact of potentiometer 18 was set near its middle point, and light 47 lighted the length of signal to which tube 28 responded was dependent on the transparency of screen 46.

It is further to be noted that the sine wave Fig. 2(A) was not "saw toothed" and that more linear response is possible with "saw toothed" waves.

It is obvious to those skilled in the art that the invention may take widely different forms from those illustrated without departing from its spirit and it is to be limited in scope only as defined in the following claims.

What I claim is:

1. An impulse duration indicating device responsive to negative signal voltages of one predetermined time length only, comprising: a vacuum tube having an input and an output circuit, a resistance shunted by a condenser connected in said input and said output circuit, the primary of a transformer and a source of current connected in said output circuit, a positive biasing source connected in said input circuit to permit said source of current to charge said condenser, means for applying said signal voltages to said input circuit, to block current flow into said condenser for said time length, indicating means responsive only to voltage of the magnitude of said voltage remaining on said condenser at the end of said time length, and means for applying a pulse from the secondary of said transformer to said indicating means to render it operable only at the end of said time length.

2. A circuit responsive to negative signal voltages of predetermined time length only, comprising: a vacuum tube having an input and an output circuit, a resistance shunted by a condenser connected in said input and said output circuit, the primary of a transformer and a source of current connected in said output circuit, means for applying said signal voltages to said input circuit to block current flow into said condenser for said time length, means for indicating the voltage across said condenser and means for applying a pulse from the secondary of said transformer to said indicating means to render it operative only at the end of said time length.

3. A vacuum tube circuit responsive to negative signal voltages of predetermined time length only, comprising: a vacuum tube having an input and an output circuit, a resistance and a condenser connected in parallel in said input and said output circuit, the primary of a transformer and a source of current connected in said output circuit, means for applying said signal voltages to said input circuit to block current flow into said condenser for said time length, means responsive only to voltages of magnitude remaining on said condenser at the end of said time length, said last means comprising a second vacuum tube having an anode, an anode grid, a cathode, an anode load in the circuit of said anode, an anode grid load in the circuit of said anode grid, a first grid for controlling current flow to said cathode from said anode and said anode grid, a second grid for controlling current flow to said cathode from said anode, means for applying voltage variations across said condenser to said first grid, means for applying voltage variations across said anode grid load to said second grid to permit anode current to flow for voltages of said magnitude, a third vacuum tube having a plate, filament, and control electrode, said plate, and filament being connected in series with said load in the circuit of said anode, means for applying a pulse from the secondary of said transformer to said control electrode at the end of said time length to permit current to flow through said anode load, and means for indicating voltage variations across said anode load.

4. A circuit for operating any one of a plurality of electro-responsive devices by input negative signal voltages of different time lengths, comprising: a vacuum tube having an input and an output circuit, a resistance in parallel with a condenser connected in said input and said output circuit, the primary of a transformer and a source of current connected in said output circuit, means for applying said signal voltages to said input circuit to block current flow into said condenser for said time lengths, a second vacuum tube having an anode, a cathode and a control electrode, a plurality of voltage magnitude operated vacuum tubes, each having a plate, filament, an anode grid, and a plurality of grids, means for connecting each of said electro-responsive devices and the anode and cathode of a separate one of said voltage magnitude operated tubes in the common anode, control electrode circuit of said second vacuum tube, means for applying voltage variations across said condenser to a first of said grids in each of said voltage magnitude operated tubes, a separate anode grid load in the circuit of each of said anode grids, means for applying voltage variations of said anode grid of each of said last tubes to a second of said grids of said last tubes to permit plate current to flow in each of said last tubes for one value of input voltage, means for biasing said first grid of each of said tubes in different magnitude, and means for applying a positive voltage pulse from the secondary of said transformer to said control electrode at the end of said time lengths.

5. A circuit for operating any one of a pluity of electro-responsive devices by a negative input voltage of one of a plurality of different time lengths, comprising: a vacuum tube having an input and an output circuit, a resistance and a condenser connected in parallel in said input and said output circuit, the primary of a transformer and a source of current connected in said output circuit, means for applying said input voltage to said input circuit, a voltage magnitude discriminating device comprising units each responsive to a different magnitude of voltage across said condenser, a vacuum tube having an anode, cathode and a control electrode, means for connecting said units in parallel in the common circuit of said anode, and said control electrode, and means for applying a positive pulse from the secondary of said transformer to said control electrode to permit current to flow through one of said units depending on the voltage remaining across said condenser at the end of said input voltage.

6. In a circuit, having indicating devices operable at different time lengths subsequent to a time reference point, a plurality of condensers, means for producing a change in voltage across a first of said condensers at a predetermined rate for a period of time, means for producing, only from the expiration of said period, a change in voltage across a second of said condensers at a second predetermined rate, a first of said indicating devices operable at a predetermined voltage across said first condenser, a second of said indicating devices operable at a predetermined voltage across said second condenser, means whereby said first of said indicating devices operates, means whereby said second of said devices operates, connections from said first indicating device to the first of said condensers, and connections from said second of said indicating devices to a second of said condensers.

7. In a circuit having indicating devices operable at different time lengths subsequent to a time reference point, a first vacuum tube having an input and an output circuit, a resistance in parallel with a condenser connected in said input and said output circuit, a second vacuum tube having an input and an output circuit, a second resistance in parallel with a second condenser connected in said input and said output circuit of said second tube, a first of said indicating devices operable at a predetermined voltage across said first condenser, a second of said indicating devices operable at a predetermined voltage across said second condenser, the primary of a transformer connected in the output circuit of one of said tubes, means for applying a negative voltage to the input circuit of said first tube for said time length, means for applying a negative voltage to the input circuit of said second of said tubes for a period subsequent to the beginning of said time length to the end of said time length, and means for applying a pulse from the secondary of said transformer to said indicating devices to render said devices operable only at the expiration of said time length.

8. A circuit for receiving negative signal voltages of one predetermined time length only comprising: a vacuum tube having an input and an output circuit, a resistance in parallel with a condenser connected in said input and said output circuit, the primary of a transformer connected in said output circuit, means for applying said signal voltages to said input circuit to block current flow into said condenser for said time length, indicating means responsive only to a voltage of the magnitude of the voltage remaining on said condenser at the end of said time length, means for applying a pulse from the secondary of said transformer to said indicating means to render it operative only at the end of said signal voltages, a photoelectric record, and means for changing the magnitude of voltages to which said indicating means is responsive with said record, to vary the time length of signal voltages to which said circuit will respond.

9. In a circuit for receiving a signal, a source of voltage variable with a duration of time, a vacuum tube having an input and an output circuit, said input and said output circuit including a plurality of parallel paths, each of said paths comprising an electro-responsive device, and a unit, each of said units being operable at a different magnitude of said variable voltage, and means controlled by said signal for applying a positive pulse to said input circuit to permit useful current to pass through one of said devices, depending on the length of said duration.

10. A signal duration indicating device comprising: a vacuum tube having an input and an output circuit, a source of current connected in said output circuit, a resistance in parallel with a condenser connected in said input and said output circuit, a positive biasing source connected in said input circuit to permit charging of said condenser by space current flowing in said output circuit, means for applying a negative voltage to said input circuit to block said space current for said duration, and means for indicating the charge remaining on said condenser at the end of said duration.

11. A signal duration indicating device comprising: a vacuum tube having an input and an output circuit, a resistance in parallel with a condenser connected in said input and said output circuit, a source of current and the primary of a transformer connected in said output circuit, a positive biasing source connected in said input circuit to permit charge of said condenser by space current flowing in said output circuit, means for applying a negative voltage to said input circuit to block said space current for said duration, means for indicating the charge remaining on said condenser at the end of said duration, said last means comprising a vacuum tube voltmeter having a grid circuit and a plate circuit, means for applying the voltage across said condenser to said grid circuit, a third vacuum tube having an anode, a cathode and a control electrode, means for connecting said anode, said cathode, and said source of current in said plate circuit, means for applying a negative potential to said control electrode to block current flow in said plate circuit, means for applying a positive pulse from the secondary of said transformer to said control electrode to permit current to flow in said plate circuit at the end of said duration, and means for indicating current flow in said plate circuit.

12. A signal duration indicating device comprising: a plurality of vacuum tubes having input and output circuits, each of said vacuum tubes having a separate resistance and condenser connected in parallel in its common input and output circuits, a source of current connected in the output circuit of said tubes, a positive biasing source connected in the input circuit of each of said tubes to permit charge of said condensers by current flowing in the output circuits of said tubes, means for applying a negative voltage to the input circuit of a first of said tubes to block current flow into a first of said condensers for said duration, means for applying a negative voltage to the input circuit of a second of said tubes to block current flow into a second of said condensers when said first condenser has discharged below a predetermined magnitude, and means for indicating the voltage of the charge remaining on each of said condensers at the end of said duration.

13. In a circuit for indicating the duration of an impulse, a voltage magnitude indicating device, a plurality of condensers, means for changing the charge on a first of said condensers at a predetermined rate for a predetermined period of time, means for changing the charge of a second of said condensers at a second predetermined rate, only from the end of said period to the end of said duration, means for applying the voltage across said second condenser to said indicating device, and means for rendering said device operative only at the expiration of said duration.

14. A signal duration indicating device comprising: a vacuum tube having an input and an output circuit, a source of current connected in said output circuit, a resistance in parallel with a condenser connected in said input and said output circuit, a positive biasing source connected in said input circuit to permit charging of said condenser by space current flowing in said output circuit, means for applying a negative voltage to said input circuit to block said space current for said duration, means for indicating the charge remaining on said condenser at the end of said duration, a record, and means for changing the voltage to which said means for indicating said charge will respond in accordance with said record.

OLIVER T. FRANCIS.